E. P. EDWARDS.
UNIVERSAL JOINT.
APPLICATION FILED OCT. 29, 1912.
1,098,101.
Patented May 26, 1914.
2 SHEETS—SHEET 1.
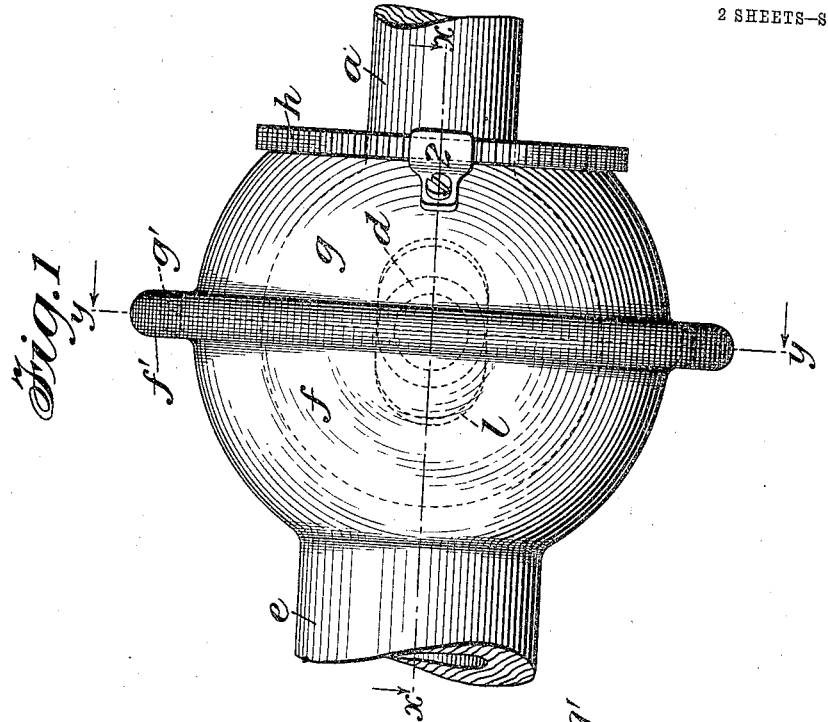
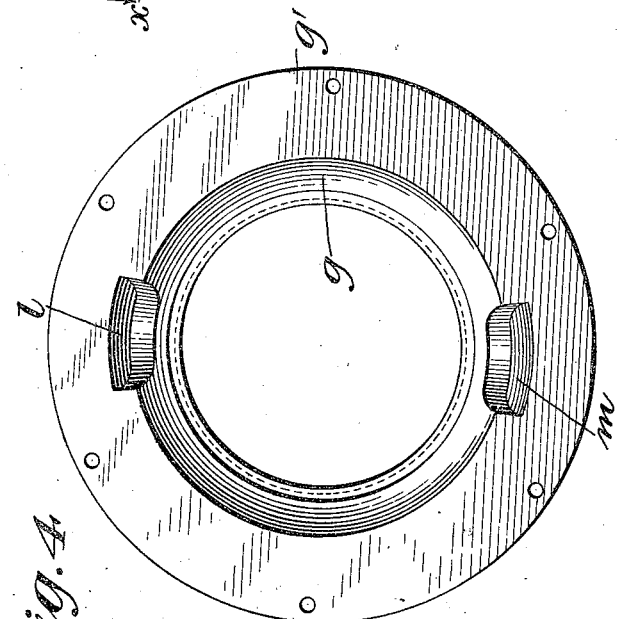
WITNESSES
Chas. F. Clagett
Bertha M. Allen.
INVENTOR
Eugene P. Edwards
BY
his ATTORNEYS E. P. EDWARDS.
UNIVERSAL JOINT.
APPLICATION FILED OCT. 29, 1912.
1,098,101.
Patented May 26, 1914.
2 SHEETS—SHEET 2.
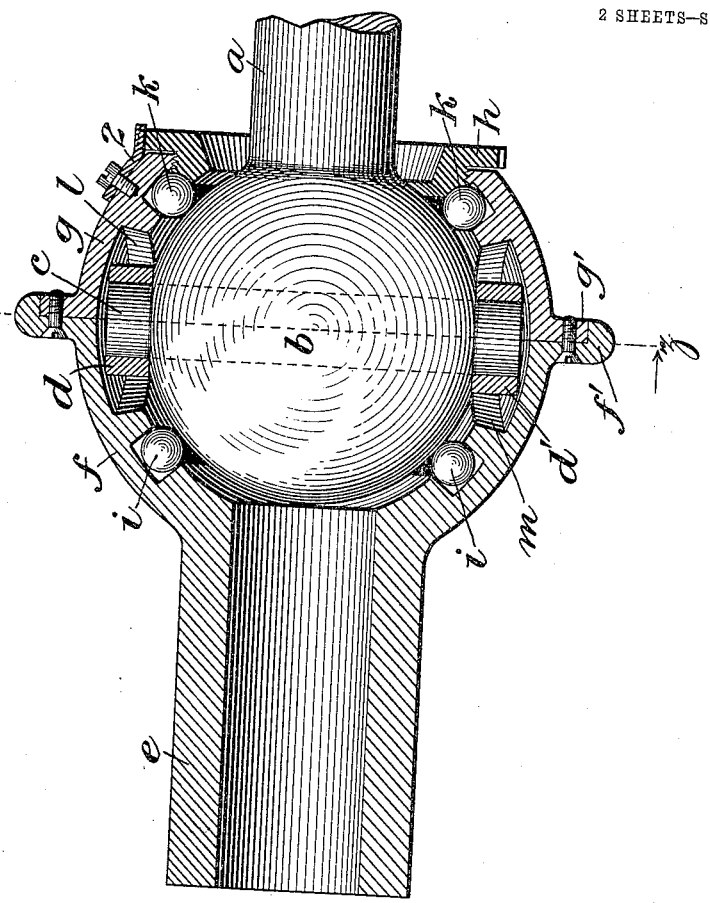
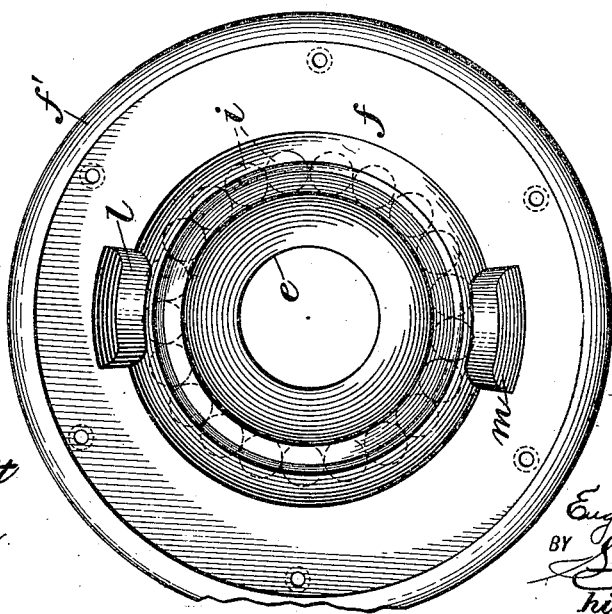
WITNESSES
Chas. J. Clagett
Bertha M. Allen.
INVENTOR
Eugene P. Edwards
BY
his ATTORNEYS

UNITED STATES PATENT OFFICE.

EUGENE P. EDWARDS, OF PLAINFIELD, NEW JERSEY, ASSIGNOR OF ONE-HALF TO SAID EDWARDS AND ONE-HALF TO A. S. GILES, OF PLAINFIELD, NEW JERSEY.

UNIVERSAL JOINT.

1,098,101. Specification of Letters Patent. Patented May 26, 1914.

Application filed October 29, 1912. Serial No. 728,522.

*To all whom it may concern:*

Be it known that I, EUGENE P. EDWARDS, a citizen of the United States, residing at Plainfield, in the county of Union and State of New Jersey, have invented certain new and useful Improvements in Universal Joints, of which the following is a specification.

My invention relates to new and useful improvements in universal joints or couplings for shafts, and the object of my invention is the reduction of frictional bearing points, simplicity of mechanism and ease of assembling and separation for cleaning.

In carrying out my invention, I provide a ball and shaft end, a sleeve, and socket members, a pin passing through the ball with the ends projecting as trunnions and rollers thereon. The opposite inner faces of the socket members are made with elliptical channels to receive said rollers, and I preferably employ two circular rows of anti-friction balls, one in each socket member, and means for holding the outermost row in position and for effecting adjustment for wear. The ball bears on these rows of balls as bearings, and the rollers and channels control the revoluble or turning movement of the ball and shaft formed therewith with reference to the sleeve and socket, all of which is hereinafter more particularly described.

In the drawing, Figure 1 is an elevation of the universal joint of my invention. Fig. 2 is a longitudinal section on about the broken line $x$ $x$ of Fig. 1. Fig. 3 is an elevation of a part of the socket, that is, one socket member and the sleeve, as if the other parts were removed. Fig. 4 is an elevation of the other socket member alone, and Fig. 5 is an elevation of the screw collar employed with the socket member shown in Fig. 4. Figs. 3 and 4 are taken on the dotted line $z$ $z$ of Fig. 2 looking in opposite directions.

$a$ represents a shaft end and $b$ a ball formed therewith and transversely perforated for the pin $c$ which passes centrally through the ball and is driven to place. The respective ends of this pin project from the opposite faces of the ball as trunnions and upon these are the rollers $d$ $d^1$. These rollers in width each agree substantially with the projection of the pin.

$e$ represents a sleeve or equivalent construction adapted to receive and engage a shaft inserted therein, and $f$ $g$ are socket members, the member $f$ being preferably formed integral with the sleeve $e$ and provided with a circumferential flange $f^1$ having a recessed face. The socket member $g$, as an annulus, is provided with a circumferential flange $g^1$ to fit into the recess in the flange $f^1$ of the socket member $f$, and screws shown exclusively in Fig. 2 are provided to any desired number, and these screws pass through the two flanges $f^1$ and $g^1$ to hold the socket members firmly together.

At opposite points within the socket members $f$ $g$, I provide elliptical channels or recesses $l$ $m$, each socket member having formed therein substantially half of each elliptical channel. These elliptical channels receive the rollers $d$ $d^1$ on the ends of the pin $c$ and provide for the swinging movement of the shaft $a$ and ball $b$ with reference to the sleeve $e$ and the socket members $f$ $g$. The inner surface of the socket member $f$ is provided with a groove concentric to the opening in the sleeve $e$ and in this channel is a row of anti-friction balls $i$. The socket member $g$ is similarly provided with a circular channel concentric with the axis of the universal joint and in this channel is a row of anti-friction balls $k$. The channel for the row of balls $i$ is preferably three-sided as shown in Fig. 2, while the channel for the row of balls $k$ is two-sided,—the other side being formed in connection with the screw collar $h$ which fits into the open outer end of the socket member $g$, screwing therein and coming against the row of balls $k$ to complete the ball receiving channel and to take up any looseness produced by wear. This screw collar $h$ must necessarily be provided with means limiting its rotation which might otherwise be produced by the turn of the row of balls $k$, consequently I have shown a toothed edge to this collar and a dog 2 held by a screw to the surface of the socket member $g$. The opening in the collar $h$, as well as the length of the elliptical channels or recesses $l$ $m$ limit the swinging or turning movement of the ball $b$ and shaft $a$, but the same is ample to provide for any reasonable angle of divergence between the axis of the shaft $a$ and ball $b$, and the axis of the sleeve $e$ and socket members $f$ $g$.

The two rows $i$ and $k$ of anti-friction balls come against the surface of the ball $b$ holding the same and immovably fixing its relation to the socket members, but at the same time permitting it to swing or turn within the socket members with the rotation of all the parts, as will be the case in use.

The diameter of the rollers $d$ $d^1$ agrees substantially with the width of the elliptical channels or recesses $l$ $m$, hence confines the same in place for the rotary movement of the parts with reference to one another and at the same time permits the ball $b$ and its shaft $a$ to swing an amount which will be controlled entirely by the length of these channels, the surfaces of the rollers coming up against the respective ends of the channels.

It goes without saying that the adjustment of the row of balls $k$ by the collar $h$ for wear also effects the adjustment of the ball $b$ with reference to the row of balls $i$ so that the parts are maintained in a snug relation to one another without lost motion.

I claim as my invention:

1. A universal joint comprising a shaft end, a ball-head connected thereto, a second shaft end, a semi-spherical socket member connected to the said second shaft end and having a bearing therein, an annular socket member also having a bearing therein, flanges connected to the said semi-spherical socket member and the said annular socket member, means for securing these flanges together, a pin projecting at diametrically opposite points from the said ball-head, a roller on each projecting end of the pin, the said socket members being provided with recesses in which the said rollers are received and operated, anti-friction devices in the said bearings and against which the surface of the said ball-head contacts, and a member surrounding the said shaft and adjustable to position in the said annular socket member for forming one side of the bearing for the said anti-friction devices in the said annular socket member.

2. A universal joint comprising a shaft end, a ball head connected thereto, a sleeve, a semi-spherical socket member connected to the sleeve and having a recess therein, an annular socket member having a recess therein, a flange connected to the semi-spherical socket member, a flange connected to the annular socket member, means for securing the flanges together, a pin extending centrally through the said ball head and projecting beyond the same, a roller on each projecting end of the said pin, the said socket members being provided with elliptical recesses in which the said rollers are received and operate, a series of anti-friction balls in the recesses in the said socket members bearing against the faces defining the said recesses therein and also against the surface of the ball head, a collar surrounding the said shaft end and adjustable to position within the said annular socket member, and forming a bearing for the anti-friction balls in the recess in the said annular socket member, and means for securing the said collar in position.

3. A universal joint comprising a shaft end, a ball head connected thereto, a sleeve, a semi-spherical socket member connected to the sleeve and having a recess therein, an annular socket member also having a recess therein, a flange connected to the semi-spherical socket member, a flange connected to the annular socket member, means for securing the flanges together, a pin extending centrally through the said ball head and projecting beyond the same, a roller on each projecting end of the said pin, the said socket members being provided with elliptical recesses in which the said rollers are received and operated, a series of anti-friction balls in the recesses in the said socket members bearing against the faces defining the said recesses therein and also against the surface of the said ball head, and a member surrounding the said shaft and adjustable to position in the said annular socket member for forming one side of a bearing for the anti-friction balls in the recess in the said annular socket member.

Signed by me, this 25" day of October, 1912.

EUGENE P. EDWARDS.

Witnesses:
HATTIE O. MATTISON,
N. J. RANDOLPH CHANDLER.